United States Patent [19]
Yamane et al.

[11] Patent Number: 6,096,361
[45] Date of Patent: Aug. 1, 2000

[54] METHOD FOR NON-FROZEN PRESERVATION OF FOOD AT TEMPERATURE BELOW FREEZING POINT

[75] Inventors: Akiyoshi Yamane; Akihiko Yamane, both of Tottori, Japan

[73] Assignee: Hyo-On Incorporated, Yonago, Japan

[21] Appl. No.: 08/913,108

[22] PCT Filed: Mar. 15, 1996

[86] PCT No.: PCT/JP96/00692

§ 371 Date: Sep. 15, 1997

§ 102(e) Date: Sep. 15, 1997

[87] PCT Pub. No.: WO96/28047

PCT Pub. Date: Sep. 19, 1996

[30] Foreign Application Priority Data

Mar. 15, 1995 [JP] Japan .................................. 7-083253

[51] Int. Cl.[7] ...................................................... A23L 3/00
[52] U.S. Cl. ........................................... 426/524; 426/393
[58] Field of Search .................................... 426/238, 524, 426/393; 99/451; 219/678, 757

[56] References Cited

U.S. PATENT DOCUMENTS 5,153,403  10/1992  Kimura .................................... 426/524

FOREIGN PATENT DOCUMENTS 5-161449   6/1993   Japan .

*Primary Examiner*—George C. Yeung
*Attorney, Agent, or Firm*—Oblon, Spivak, McClelland, Maier & Neustadt, P.C.

[57] ABSTRACT

A method of preserving perishable food in a nonfrozen state in the nonfreezing region below the freezing point of the food, which comprises comparatively rapidly cooling the food from the ordinary temperature to the vicinity of the freezing point of the food and then slowly cooling the food below the freezing point at a cooling rate of 0.01–0.5° C./h, and this method permits perishables such as vegetables, fruits, fishes or shellfishes to be preserved with a high freshness and can suppress without fail any lowering in the freshness thereof which inevitably occurs immediately after harvesting. High-freshness and high-quality perishables can be supplied to consumers without suffering the lowering in the freshness thereof immediately after harvesting by the combination of the perishables treated as above can be kept for long in the hands of the consumers and can be prevented from undergoing rapid deterioration of the quality unlike conventional ones, and further it is possible to produce frozen products of the type unavailable heretobefore.

8 Claims, 3 Drawing Sheets

METHOD FOR NON-FROZEN PRESERVATION OF FOOD AT TEMPERATURE BELOW FREEZING POINT

TECHNICAL FIELD

This invention relates to a method for the non-frozen preservation of food or the like in a temperature zone below the freezing point, and more particularly, the present invention is a method for preserving perishable food or the like in a non-frozen state in a non-freezing region below the freezing point, and relates to a non-frozen preservation method for perishable food or the like in which a slow cooling treatment for putting said perishable food or the like in a non-frozen state below the freezing point is combined with a stepped temperature elevation treatment for elevating the temperature of the perishable food or the like in said non-frozen state to room temperature, which makes it possible to maintain perishable food or the like in a favorable non-frozen state in a temperature zone below the freezing point, and also makes it possible to maintain the effect and characteristics of the non-freezing treatment and to restore the food favorably to room temperature, and relates to the temperature elevation method therefore and the like.

BACKGROUND ART

In the course of extended basic and applied research into the preservation and processing of various perishable foodstuffs, biological tissue, and the like in a low temperature zone below 0° C., the inventors established so-called "super CFP (Controlled Freezing Point; CFP means the temperature zone between 0° C. and freezing point of a food or the like and super CFP means the temperature zone between freezing point and breaking point of it." preservation and processing techniques characterized in that various perishable foodstuffs or the like are preserved and processed in a non-freezing region below the freezing point, and have previously succeeded in developing methods for preserving various perishable foods and the like under such super CFP conditions, as well as methods for preserving and processing vegetables, fruits, seafood, and other such perishable foods and the like by utilizing super-cold water. As a result of research into these methods, the inventors discovered that it is possible to keep just-harvested vegetables, fruits, seafood, and other such perishable foods and the like at a high level of freshness during their storage by subjecting said perishable food or the like to a cooling treatment under specific super-cold conditions in a non-freezing region below the freezing point. The inventors also discovered that these methods are extremely useful especially as methods for preserving and processing vegetables, fruits, seafood, and other such perishable food or the like.

In general, among the various foods and the like, it is particularly important for vegetables and fruits, being natural products, to be fresh, just as with seafood and the like. The continuous maintenance of freshness and quality are considered vital throughout the course of distribution, from the place where these foods are produced to the market, and from the market to the place of sale.

Thus, the ideal way to supply products in a fresh and high-quality form would be via a "cold chain" that comprises specific low-temperature conditions, from the production stage (the site of harvest) to the consumption stage. In actual practice, however, the preservation conditions are often less than adequate along the distribution channels, which is due to distribution cost considerations, low-temperature preservation technology limitations, and so on.

As the mass production and mass consumption of foods becomes increasingly common, consumer needs are becoming more diverse, and many different types of product are appearing on the market in response to this diversification. This has been accompanied by a trend in which consumers demand products of lower cost and higher quality. There is also growing interest in natural foods when it comes to vegetables, fruits, seafood, and other such perishable food and the like, which has created a strong demand for high-quality products that are fresh and high in nutritional value.

As mentioned above, vegetables, fruits, seafood, and other such perishable food and the like are harvested and produced in many different locations as agricultural and marine products, and in most cases reach the consumer after first going through a market and a retail outlet, so even today, with all of our sophisticated technology for preserving said perishable food or the like, it is still quite difficult to maintain that fresh-picked or fresh-caught flavor and freshness over an extended period. For instance, even if the distribution time could be specially shortened to ensure a good state of preservation, the cost at the current time would be tremendous, and except for some high-end products, this would be an impractical method for the general distribution of perishable foods.

Low-temperature preservation methods, low-temperature preservation equipment, low-temperature transportation technology, and the like used in the course of distribution have been studied from various angles in the past in an effort to improve this situation even a little, and the result up to this point has; been the development of widely diverse techniques. Typical examples of these are CA storage and MA storage (Shokuhin Ryutsu Gijutsu, Vol. 22, No. 11 (1993)), although various other methods have also been developed and improvements made. Still, there is generally a precipitous decline in the freshness of perishable foods immediately after their harvest, just as with the decrease in freshness in the course of distribution. Specifically, with fruits and vegetables, there is a rapid decomposition of useful components such as vitamin C and other nutrients, chlorophyll, and so on, and with seafood, there is a decrease in the K value (an index of freshness) caused by the rapid decomposition of ATP, and since these and other deteriorations in quality inevitably occur, unless some new technique is developed that will allow such decreases in freshness immediately after harvest to be reliably suppressed, it will remain impossible to maintain a state of high freshness close to that immediately after harvest.

DESCRIPTION OF THE INVENTION

With the foregoing in mind, the inventors conducted painstaking investigation aimed at the development of a new technique that would be better than the above-mentioned prior art, and that would especially make it possible to maintain vegetables, fruits, seafood, and other such perishable food or the like in their high state of freshness immediately after harvest. In the course of this investigation, they turned their attention to a method in which vegetables, fruits, seafood, or other such food or the like is subjected to a cooling treatment under specific super-cold conditions, and arrived at the present invention upon succeeding at establishing a novel slow conditioning technique, with which it is possible to simply and reliably maintain perishable food or the like in a favorable non-frozen state in a non-freezing region below the freezing point, as a basic technology for reliably achieving a non-frozen state of food or the like in said non-freezing region below the freezing point.

Specifically, an object of the present invention is to provide a method for the non-frozen preservation of perishable food or the like, which makes it possible to keep vegetables, fruits, seafood, and other such perishable food and the like at a high level of freshness without causing any decrease in freshness or deterioration in quality, and to provide a slow cooling method and means with which it is possible to simply and reliably achieve a non-frozen state for food or the like in the temperature zone below the freezing point.

A further object of the present invention is to provide a method for manufacturing food or the like in a non-frozen state below the freezing point by utilizing the above-mentioned non-frozen preservation method, and a product of this method.

A still further object of the present invention is to provide a method for preserving perishable food or the like at a high level of freshness, with which it is possible to keep vegetables, fruits, seafood, and other such perishable food or the like in a non-freezing region below the freezing point for an extended period without the food losing the freshness it had immediately after harvest.

Another object of the present invention is to provide a slow conditioning technique for favorably controlling the temperature conditions in said non-freezing region, the temperature conditions for restoring the food to room temperature, and the like in a method for preserving perishable food or the like in a non-frozen state in the non-freezing region below the freezing point.

The first embodiment of the present invention for achieving the stated objects is a method for preserving food or the like in a non-frozen state in a temperature region below the freezing point, which comprises relatively rapidly cooling the food or the like from room temperature to close to the freezing point, and then slowly cooling the food or the like at a gradual cooling rate of 0.01 to 0.5° C./hour to below the freezing point.

The second embodiment of the present invention is a method for preserving food or the like in a non-frozen state in a temperature region below the freezing point, wherein the food or the like is introduced into a non-freezing region below the freezing point, and kept in a low temperature zone 0.1 to 10° C. below the freezing point, and then preserved in this low temperature zone.

The third embodiment of the present invention is a method for preserving food or the like in a non-frozen state in a temperature region below the freezing point, wherein the temperature of the food or the like is elevated to the freezing point or to 0.5 to 1.0° C. over the freezing point at a suitable time during preservation and in a suitable cycle.

The fourth embodiment of the present invention is a method for elevating to room temperature the temperature of the food or the like, in which food or the like is preserved in a non-frozen state in a non-freezing region below the freezing point, wherein the temperature is elevated at a gradual temperature elevation rate of 0.01 to 0.5° C./hour to close to the freezing point, and then, from the freezing point to room temperature, after setting the temperature elevation conditions to a suitable temperature, the temperature is elevated in stages at suitable times.

The fifth embodiment of the present invention is cooling equipment, furnished with a control apparatus for automatically controlling the temperature conditions.

The sixth embodiment of the present invention is a method for manufacturing non-frozen water in a temperature zone below the freezing point by the above method, wherein the impurities in the raw material water are removed ahead of time by filtering and/or distilling the raw material water by means of a microfilter or the like.

The seventh embodiment of the present invention is a method for manufacturing food or the like in a non-frozen state below the freezing point by the above method, wherein the food or the like is cooled by means of a slow cooling treatment at a gradual cooling rate of 0.01 to 0.5° C./hour under specific pressurization conditions.

The eighth embodiment of the present invention is the above method for preserving food or the like in a non-frozen state in a temperature region below the freezing point, wherein the food or the like is irradiated with far infrared rays, microwaves, or other such light, and/or is irradiated with static electricity, and/or is vibrated in a temperature zone above the breaking point at a suitable time during preservation and in a suitable cycle in order to stabilize the supercooled state below the freezing point.

The ninth embodiment of the present invention is cooling equipment, furnished with an apparatus for providing the pressurization, irradiation, and/or vibration.

The tenth embodiment of the present invention is the above method for preserving food or the like in a non-frozen state in a temperature region below the freezing point, wherein in a specific low temperature region is cooled a food or the like that has been packaged or covered with a packaging material such as a synthetic resin, paper, or a biological material; or with a packaging material coated with glycerol or another such ice nucleatation inhibiting substance, a glycoprotein, or gelatin or another such ice crystal growth inhibiting substance; or with a cover film of these substances.

The eleventh embodiment of the present invention is a method for preserving a food or the like composed of an animal or vegetable material in a non-freezing region below the freezing point with only the inner cells thereof in a non-frozen state, wherein the food or the like is rapidly frozen from a supercooled state below the freezing point, using a rapid freezing treatment combined with above the non-frozen preservation method to obtain the outer cells of the food or the like frozen, and the inner cells preserved in a non-frozen state.

The twelfth embodiment of the present invention is a method for manufacturing a frozen food or the like from a food or the like preserved in a non-frozen state in a non-freezing region below the freezing point, wherein the food or the like is subjected to a rapid freezing treatment from a supercooled state below the freezing point, using a rapid freezing treatment combined with the above non-frozen preservation method to obtain the food or the like rapidly frozen.

Another embodiment of the present invention is a method for manufacturing non-frozen water in a temperature zone below the freezing point by the above method, wherein a flow rate of 0.1 to 2000 m/min is imparted to the raw material water in the course of the cooling step to inhibit the formation of ice nuclei and the growth of ice crystals in the raw material water preferably.

Still another embodiment of the present invention is a method for pre-thawing a fro:en food and obtaining a high-quality thawed food while :raising the temperature in stages at suitable times, wherein the food or the like is gradually thawed with suppressed damage to the cells or tissue while the temperature is raised in stages after gradual thawing while the non-frozen components in the frozen food are maintained in a supercooled state (1 to 10° C. below the freezing point).

The present invention will now be described in further detail.

As mentioned above, the present invention is a method for preserving food or the like (such as vegetables, fruits, seafood, and other such perishable foods, as well as foods composed of animal or vegetable materials, various processed foods, food raw materials, raw material water, animal or vegetable biological materials, biological tissue, and so on) in a non-frozen state in a non-freezing region below the freezing point, and relates to a non-frozen preservation method for food or the like, which comprises relatively rapidly cooling the food or the like (within from 1 to 30 minutes or a few hours) from room temperature to close to the freezing point of said perishable food or the like, and then slowly cooling the food or the like at a gradual cooling rate of 0.01 to 0.5° C./hour to below the freezing point. The "method for preserving food or the like in a non-frozen state in a non-freezing region below the freezing point" referred to in the present invention means, for example, a preservation method comprising the transition of various foods or the like to a non-frozen state in a non-freezing region below the freezing point by subjecting the food or the like to a super-slow cooling treatment by a stepped cooling process in the presence or absence of a freezing point depressant, a component having a freezing point depressing action, or a component having the same effect (super CFP preservation method ("super CFP" is a registered trademark)). Regardless of the treatment method or means thereof, any method that has the same effect as said method shall be similarly considered. In this case, it goes without saying that there are no particular restrictions on the type and usage form of the freezing point depressant, the component having a freezing point depressing action, or the like.

According to investigation conducted by the inventors, it was generally extremely difficult in the past to keep a food or the like in a non-frozen state in a temperature zone below the freezing point, but due to the above-mentioned slow conditioning technique, it is possible to keep a food or the like in a non-frozen state in a temperature zone below the freezing point both simply and reliably. With the present invention, it is possible to expand said non-freezing region below the freezing point (super CFP region) regardless of the type of food or the like. The present invention can be applied especially favorably to vegetables, fruits, seafood, and other such perishable food or the like, but is not limited to these, and can also be applied to fermented foods, processed foods, food raw materials, intermediate products, cooked foods, animal or vegetable biological materials, biological tissue (cells or tissue from animals or plants), and the like. In the present invention, any method may be employed to subject the food or the like to a cooling treatment in a temperature zone in the non-freezing region below the freezing point as long as a relatively rapid cooling treatment can be carried out in a low-temperature region below 0° C., and as long as a slow cooling treatment to below the freezing point at 0.01 to 0.5° C./hour, and preferably 0.01 to 0.4° C./hour, can be carried out, and no particular restrictions are imposed on this method, but a method in which the cooling is accomplished by cooling equipment furnished with a control apparatus for automatically controlling the temperature conditions (an automatic temperature control apparatus) is a favorable example thereof.

When a perishable food or the like is subjected to a cooling treatment by the above-mentioned rapid cooling treatment and slow cooling method, the perishable food or the like is favorably cooled gradually below the freezing point, so that the perishable food or the like is stable in the non-freezing region below the freezing point without freezing, and is maintained in a favorable non-frozen state. Furthermore, investigation on the part of the inventors has revealed that when the above-mentioned slow cooling treatment conditions and process are not employed, that is, when a slow cooling treatment involving cooling at a gradual rate of 0.01 to 0.5° C./hour to below the freezing point is not performed, it is difficult to maintain a food or the like in a non-frozen state in the temperature zone below the freezing point, and the stated objects cannot be achieved.

In the present invention, the food or the like is introduced into a non-freezing region below the freezing point, and kept in a low temperature zone 0.1 to 10° C. below the freezing point, and then preserved in this low temperature zone for between several hours and several months, but since the favorable range of said low temperature zone varies considerably with the type and properties of the food or the like, it should be question. Examples will now be given of the freezing points of various foods and the like, and the non-freezing regions below said freezing points (super CFP regions), investigated on the basis of the above-mentioned slow conditioning technique of the present invention.

Super CFP regions for various foods and the like:

| Food or the like | Freezing point (° C.) | Super CFP region (° C.) |
|---|---|---|
| Vegetables | | |
| Tomato | −0.9 | −0.9 to −5.0 |
| Onion | −1.1 | −1.1 to −6.0 |
| Peas | −1.1 | −1.1 to −6.5 |
| Cauliflower | −1.1 | −1.1 to −7.0 |
| Potato | −1.7 | −1.7 to −13.0 |
| Sweet potato | −1.9 | −1.9 to −15.0 |
| Asparagus | −0.6 | −0.6 to −5.0 |
| White onion | −0.8 | −0.8 to −6.0 |
| Lettuce | −0.2 | −0.2 to −4.0 |
| Radish | −0.8 | −0.8 to −6.0 |
| Fruits | | |
| Persimmon | −2.1 | −2.1 to −15.5 |
| Apple | −1.5 | −1.5 to −15.0 |
| Lemon | −2.2 | −2.2 to −18.0 |
| Cherry | −2.4 | −2.4 to −18.0 |
| Asian pear | −1.5 | −1.5 to −15.0 |
| Strawberry | −0.9 | −0.9 to −6.0 |
| Fig | −2.4 | −2.4 to −17.5 |
| Peach | −0.9 | −0.9 to −7.5 |
| Blueberry | −1.3 | −1.3 to −15.0 |
| Apricot | −1.1 | −1.1 to −13.0 |
| Seafood | | |
| Blowfish | −1.5 | −1.5 to −15.5 |
| Horse mackerel | −1.5 | −1.5 to −15.5 |
| Mackerel | −1.5 | −1.5 to −15.5 |
| Sardine | −2.0 | −2.0 to −18.0 |
| Cod | −1.2 | −1.2 to −15.0 |
| Yong yellowtail | −1.2 | −1.2 to −15.0 |
| Sole | −1.2 | −1.2 to −15.0 |
| Snow crab | −2.2 | −2.2 to −18.0 |
| Scallop | −2.2 | −2.2 to −18.0 |
| Animal products | | |
| Beef | −1.7 | −1.7 to −18.0 |
| Pork | −1.4 | −1.4 to −15.0 |
| Chicken | −1.3 | −1.3 to −15.0 |
| Milk | −0.5 | −0.5 to −8.0 |
| Butter | −2.2 | −2.2 to −19.5 |
| Cheese | −8.3 | −8.3 to −25.0 |
| Processed foods | | |
| Pickles | −3.0 | −3.0 to −18.0 |
| Fermented soybeans | −3.1 | −3.1 to −18.0 |
| Salted squid | −5.3 | −5.3 to −20.0 |

| Food or the like | Freezing point (° C.) | Super CFP region (° C.) |
| --- | --- | --- |
| Bread | −5.0 | −5.0 to −20.0 |
| Beer | −2.8 | −2.8 to −17.0 |

Of the food or the like that is the subject of the present invention, vegetables, fruits, animal products, seafood, and other such perishable food or the like may be any ordinary vegetables, fruits, animal products, or seafood, and the present invention is applicable regardless of the type thereof. In addition to these, the "perishable food or the like" referred to in the present invention also encompasses fresh flowers, medicinal herbs, rice bran and other grains, nuts, and other such foods, as well as fresh plants related to these, and so on. When the present invention is utilized to keep a perishable food or the like fresh, it is important that this perishable food or the like be treated as soon after its harvest as possible. This permits an effective suppression of the decrease in freshness of perishable food or the like that inevitably occurs immediately after harvest, namely, with fruits and vegetables, the rapid decomposition of useful components such as vitamin C and other nutrients, chlorophyll, and so on, and with seafood, the decrease in the K value (an index of freshness) caused by the rapid decomposition of ATP, and other such deteriorations in quality. Herein, "immediately after harvest" means the stage immediately after harvest at the site where the perishable food is harvested or produced, but since the decrease in freshness immediately after harvest varies greatly with the type of perishable food or the like, the season of harvest, and other factors, the timing of the cooling preservation treatment should be suitably determined according to the perishable food or the like in question. In general, the above-mentioned cooling preservation treatment should be carried out within a few hours after harvest. Furthermore, the present invention is not limited to a perishable food or the like immediately after harvest, and of course can also be applied similarly to a perishable food or the like at a suitable point in the distribution process, or to a perishable food or the like at the consumption stage.

To put the perishable food or the like in a non-frozen state in a non-freezing region below the freezing point, it is preferable to perform the treatment at the site of harvest or production, but it is also possible, for example, to load the food or the like onto a truck or the like equipped with cooling equipment and ship it to the treatment site, and it is also possible to treat the perishable food or the like where large-scale cooling equipment is located.

With the present invention, a perishable food or the like that has just been harvested is subjected to a cooling preservation treatment under the above-mentioned super-cold conditions in a non-frozen state in a non-freezing region below the freezing point, which makes it possible to effectively suppress the decrease in freshness of perishable food that occurs immediately after harvest, namely, with fruits and vegetables, the rapid decomposition of useful components such as vitamin C and other nutrients, chlorophyll, and so on, and with seafood, the decrease in the K value (an index of freshness) caused by the rapid decomposition of ATP, and other such deteriorations in quality, and also makes it possible to supply perishable food or the like with high levels of freshness and quality that could not be obtained with a conventional preservation method.

Furthermore, according to investigation on the part of the inventors, even when a perishable food or the like that has undergone a cooling treatment as mentioned above is thereafter maintained in an ordinary preservation state, the decrease in freshness will still be markedly suppressed, and it will be possible to maintain a high level of freshness simply and reliably by means of said cooling treatment.

With the present invention, in the above-mentioned method for preserving a food or the like in a non-frozen state in a non-freezing region below the freezing point, it is also possible to maintain the food or the like simply and favorably in a non-frozen state by adding a step in which the temperature is elevated to the freezing point or to between 0.5 and 1.0° C. over said freezing point at a rate of no more than 1° C. in a period ranging from 1 hour to several days at a suitable time and in a suitable cycle during the preservation. Therefore, the addition of said temperature elevation step to the above-mentioned method of the present invention for the non-frozen preservation of a food or the like in a temperature zone below the freezing point is desirable in that the non-frozen state is even more stable.

With the present invention, in order to restore to room temperature a food or the like that has been preserved in a non-frozen state in a non-freezing region below the freezing point, the food or the like is not heated rapidly, but rather is subjected to a temperature elevation treatment at a gradual temperature elevation rate of 0.01 to 0.5° C./hour up to the freezing point, and then, from the freezing point up to room temperature, the temperature elevation conditions are set to suitable temperatures of 0° C., 5° C. and 15° C., so that the temperature is elevated in stages at suitable times. In this case, it is also possible for the temperature to be elevated at a relatively high rate from the freezing point to room temperature, and the rate should be suitably set according to the type and properties of the food or the like in question.

The form of the food or the like is not limited to a solid food or the like (including powders and the like), and the present invention can also be applied to a liquid food or the like, such as alcoholic and non-alcoholic beverages, tea beverages, and drinking water.

For example, the method of the present invention can be applied to drinking water to manufacture non-frozen water below the freezing point (below 0° C.). In this case, the impurities in the raw material water can be removed ahead of time by filtering and/or distilling the raw material water by microfilter filtration, precision filtration, ultrafiltration, or another such suitable means, which allows the non-freezing region below the freezing point to be expanded stably and simply. Also, a flow rate of 0.1 to 2000 m/min can be imparted to the raw material water in the course of the cooling step, which allows the formation of ice nuclei and the growth of ice crystals in the raw material water to be inhibited.

Also, in order to preserve the food or the like more stably in a non-frozen state in a non-freezing region below the freezing point, that is, to stabilize the supercooled state below the freezing point, it is desirable to add a step in which the food or the like is irradiated with far infrared rays, microwaves, or other such light, and/or is irradiated with static electricity, and/or is vibrated continuously or discontinuously in a temperature zone above the breaking point (the lower limit of the non-freezing region) at a suitable time during preservation and in a suitable cycle. There are no particular restrictions on the treatment conditions, method, or means in the optical irradiation, static electricity irradiation, and/or vibration as long as they allow the non-freezing region below the freezing point to be expanded, and the conditions, method, and equipment should be suitably selected.

Also, in the present invention, in order to make the cooling more gradual and to prevent damage caused by ice crystals, it is possible to cool to a specific low temperature region a food or the like that has been packaged or covered with a packaging material such as polyethylene or another synthetic resin, Japanese paper or another type of paper, or a biological material; or with a suitable material capable of satisfying the gradual cooling conditions and preventing partial supercooling of the food; or with a packaging material coated with an inner film of glycerol or another such ice nucleatation inhibiting substance, a glycoprotein, or gelatin or another such suitable chemical substance that inhibits ice crystal growth; or with a cover film of these substances. When packaging or covering materials such as these are used in the present invention, the expansion of the non-freezing region below the freezing point and even better stabilization of the non-frozen state in said region can be achieved.

Furthermore, in the present invention, it is possible to preserve a perishable food or the like, especially one composed of an animal or vegetable material, with only the inner cells thereof in a non-frozen state. The above-mentioned slow cooling treatment, which is carried out at a gradual cooling rate of 0.01 to 0.5° C./hour, can be combined with a rapid freezing treatment, in which the food or the like is frozen at −18° C. or lower, for example, from a supercooled state below the freezing point, which makes it easier for the extracellular fluid to freeze, while making it more difficult for the intracellular fluid to freeze, so that it is possible to freeze the outer cells of the food or the like and to preserve the inner cells in a non-frozen state. When a method such as this is employed in the present invention, it is possible to maintain a perishable food, especially fruit, an animal product, seafood, or the like, at a high level of freshness and quality.

This method can be used to advantage in the case of other foods and beverages or the like as a method for instantly freezing, from a supercooled state below the freezing point, water, a beverage (such as coffee, black tea, oolong tea, green tea, fruit juice, and other cooling drinks, or fruit sauce, jam, alcoholic beverages, and the like), a food, or the like that has been preserved in a non-freezing region below the freezing point. When a slow cooling treatment performed at a gradual cooling rate of 0.01 to 0.5° C./hour is combined with a rapid freezing treatment, together with the addition of ice nuclei (ice crystals or another ice crystal forming substance) to the food or the like, a treatment in which pressure, vibration, or friction is instantaneously released from the vessel side walls, or the like as needed, it is possible to manufacture a frozen product that retains high levels of quality, properties, and so on for a variety of foods and beverages by flash freezing, such as sherbet, popsicles, ice cream, frozen liquors (such as beer, sake, shochu, wine, whiskey, and brandy), chilled tofu, thinly-sliced raw fish, uncured ham, and fruit.

It is also possible with the present invention to obtain a high-quality thawed product by pre-thawing a frozen food in a temperature region below the freezing point and elevating the temperature in stages at suitable times. A frozen product can be thawed with suppressed damage to the cells or tissue while the temperature is raised in stages after gradual thawing while the non-frozen components in the frozen food are maintained in a supercooled state (1 to 10° C. below the freezing point).

As discussed above, the present invention can be utilized favorably as a technique for preserving and processing perishable food (such as agricultural, animal, and marine products); pickles; pickled seafood; meat products; noodles; jams; fish paste; refined sake, beer, and other liquors; table vinegar, fermented soybeans, dairy products, and other such processed foods and fermented foods; animal and plant cell:, and other such biological tissue; and so on. In addition to the benefit of being able to preserve a perishable food at high levels of freshness and quality, it is also possible to obtain a good aging effect with the above-mentioned processed and fermented foods, without any attendant deterioration in quality, by preserving the food in the non-freezing region below the freezing point, and as a result of said aging effect, the flavor is improved and the quality of the processed or fermented food is even higher.

BEST MODE FOR CARRYING OUT THE INVENTION

Figure 1:
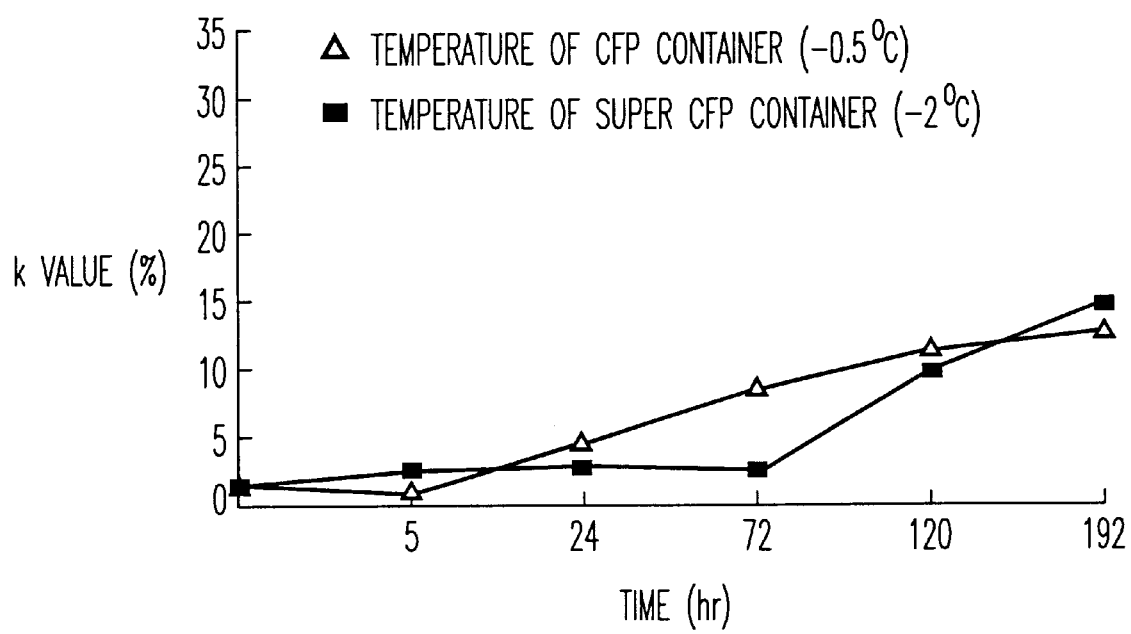
FIG. 1 is an explanatory diagram illustrating the results of the Friding treatment of horse mackerel (super CFP preservation (−2° C.))

The present invention will now be described in specific terms through examples of the present invention, but the present invention is not limited in any way by said examples.

EXAMPLE 1

Cooling Preservation Treatment of Vegetables in Super-low-temperature Region (super CFP region)

A perishable food (lettuce) that had just been harvested was put in a refrigerator and subjected to a cooling treatment by rapid cooling treatment to close to the freezing point (−0.2° C.), then subjected to a slow cooling treatment in which it was cooled at a gradual cooling rate of 0.1° C./hour to below the freezing point, and then said perishable food was preserved in a non-frozen state in a non-freezing region below the freezing point (−0.2 to −4.0° C.). After the perishable food had been preserved for 1 week in said non-freezing region, it was subjected to a temperature elevation treatment at a gradual temperature elevation rate of 0.1° C./hour up to the freezing point without being heated rapidly, after which the temperature was elevated from the freezing point up to 5° C. A perishable food (lettuce) that had undergone a cooling treatment by the above-mentioned slow cooling method, and one that had not undergone said cooling treatment were stored for 22 days in a 5° C. refrigerator and then examined for the state of preservation of their freshness. The results of this are given in Tables 1 and 2. As is clear from the results in Table 1, the food that was cooled by the above-mentioned slow cooling method had good freshness preservation, appearance, and taste, whereas the food that did not undergo said cooling treatment had markedly diminished freshness, and its appearance and texture were found to be poor. Also, as is clear from the results in Table 2, the vitamin C residual rate was found to be markedly higher after the cooling treatment.

TABLE 1

|  | Freshness | Taste | Appearance |
|---|---|---|---|
| Super CFP cooling treatment | +++ | +++ | +++ |
| No treatment | – | – | – |

Notes:
1) Freshness: Extent to which the green color was preserved
2) Taste: Softness on tongue, Crispiness
3) Appearance: Extent of wilting and swelling
4) +++: extremely good; ++: good; +: average; –: somewhat poor; – –: poor; – – –: extremely poor

TABLE 2

|  | Vitamin C residual rate (%) |
|---|---|
| Super CFP cooling treatment | 95 |
| No treatment | 10 |

EXAMPLE 2

Cooling Treatment of Fruits and Vegetables in Super-low-temperature Region (super CFP region)

The state of preservation of freshness was examined for a variety of perishable foods (tomato, onion, peas, cauliflower, potato, sweet potato, asparagus, okra, white onion, radish, persimmon, apple, lemon, cherry, Asian pear, strawberry, fig, peach, blueberry, and apricot) in the same manner as in Example 1. of these, the results for asparagus, okra, and cauliflower are given in Table 3. For each of these, it was found that the same effect as in Example 1 was obtained, just as with the results in Table 3.

TABLE 3

|  | Treatment temperature (° C.) | Storage period (days) | Appearance | Vitamin C residual rate (%) |
|---|---|---|---|---|
| Asparagus | –1 | 14 | +++ | 90 |
| Okra | –1 | 14 | +++ | 90 |
| Cauliflower | –1 | 14 | +++ | 85 |

Note: The evaluation of appearance was the same as in Table 1.

EXAMPLE 3

Friding Treatment of Horse Mackerel (round) in Super-low-temperature Region (super CFP region)

(1) Method

The horse mackerel used in this Example 3 was cultivated horse mackerel. As to the cooling treatment, the perishable food (live horse mackerel) was put into a super CFP container (–2° C.) and into a freezing container (–0.5° C.) and subjected to a cooling treatment by rapid cooling treatment to close to the freezing point (–1.5° C.). This product was then subjected to a slow cooling treatment in which it was cooled at a gradual cooling rate of 0.1° C./hour to below the freezing point, and said perishable food was then preserved in a non-frozen state in a non-freezing region below the freezing point (–1.5 to –15.5° C.). After the perishable food had been preserved for 1 week in said non-freezing region, it was subjected to a temperature elevation treatment at a gradual temperature elevation rate of 0.1° C./hour up to the freezing point without being heated rapidly, after which the temperature was elevated from the freezing point up to 5° C. A perishable food (live horse mackerel) that had undergone a cooling treatment by the above-mentioned slow cooling method, and one that had been immersed and cooled in an ice water container (+2° C.) were then preserved at temperatures of –2° C. (super CFP group), –0.5° C. (freezing group), and +2° C. (ice water group), and these samples were subjected to a sensory test by a panel of experts and to measurement of the K value (an index of freshness) by a standard method, which were conducted at the start of the experiment and 5, 24, 72, and 192 hours later.

(2) Results

Figure 2:
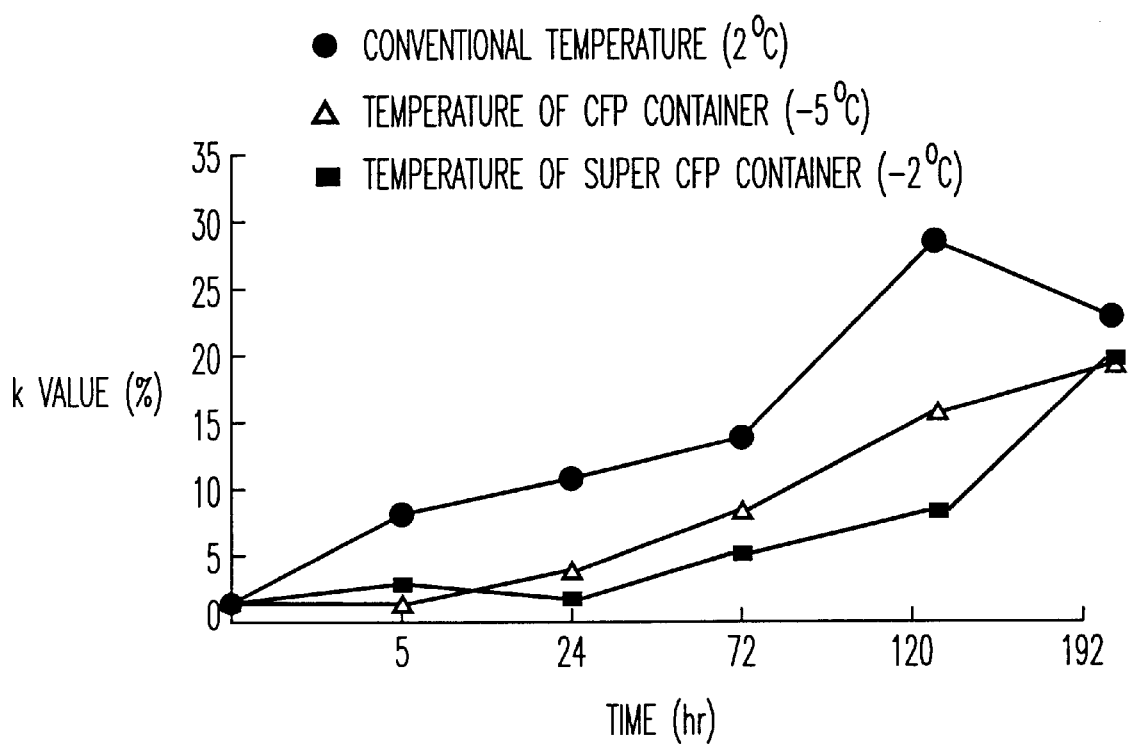
FIG. 2 is an explanatory diagram illustrating the results of the Friding treatment of horse mackerel (CFP preservation (−0.5° C.))
Figure 3:
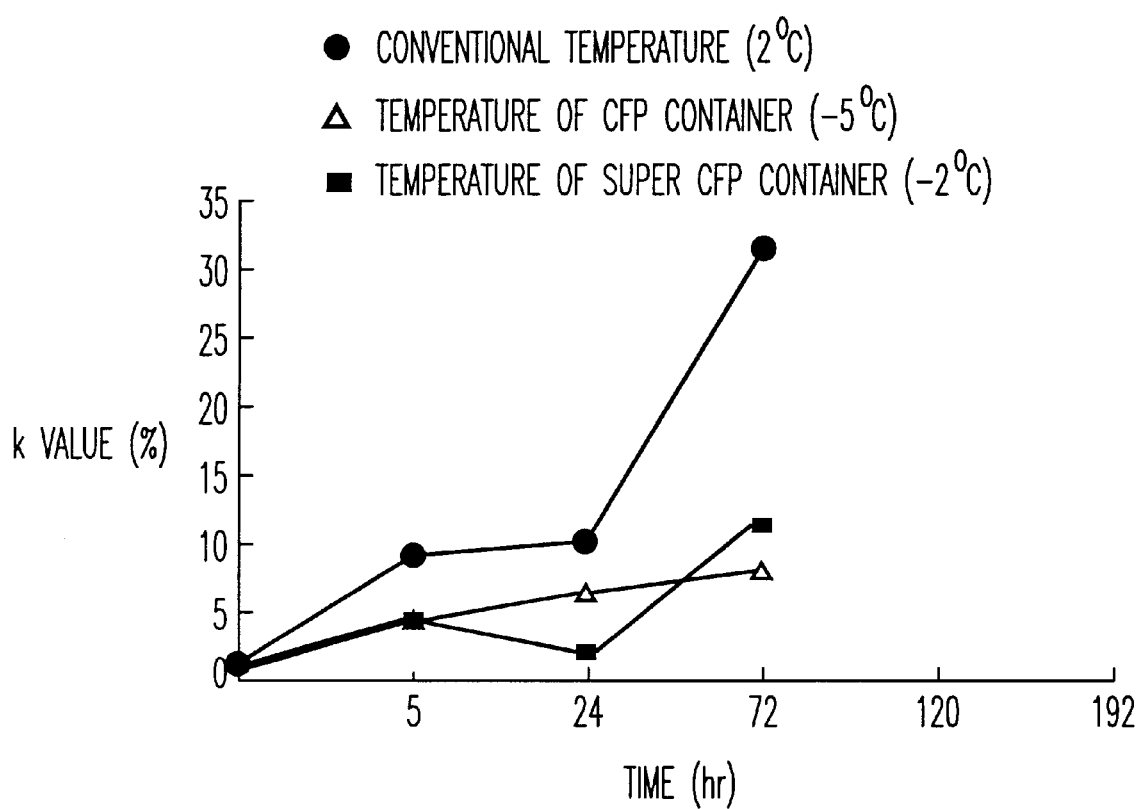
FIG. 3 is an explanatory diagram illustrating the results of the Friding treatment of horse mackerel (preservation with ice (0° C. to 16° C.)).

The K values for the horse mackerel cooled using the freezing container and super CFP container were lower than that of the horse mackerel cooled in the ice water container, and furthermore, the change in these values was less over the various preservation temperatures and elapsed days of preservation, which meant that the gap between these values and the value for the ice water cooling treatment widened, which makes the difference in freshness more distinct. These results are given in FIGS. 1 through 3. Meanwhile, the sensory tests revealed that the samples in the super-low temperature treatment group were fresher and higher in quality than those in the ice water treatment group.

The Friding treatment at a super-low temperature was also investigated for various types of seafood in the same manner as in Example 3, which yielded roughly the same results.

EXAMPLE 4

Super CFP Preservation and Aging of Leaf Onions

Leaf onions were put into a refrigerator and subjected to a cooling treatment by rapid cooling treatment to 0° C., after which they were subjected to a slow cooling treatment in which they were cooled at a gradual cooling rate of 0.1° C./hour to the freezing point of –0.8° C., after which this perishable food was preserved in a non-freezing region of –0.8 to –0.2° C. in a non-frozen state below the freezing point. After the food had been preserved for 2 weeks in this non-freezing region, the temperature was gradually elevated to the freezing point, and the temperature was then elevated from the freezing point to room temperature.

Observation of the state after 2 weeks revealed that while the vitamin C content in the refrigerated group (control group; preserved at 5° C.) was 6.2 mg %, that of the cooling treatment sample was 27 mg %, and while the appearance of the refrigerated sample showed that part of the sample had rotted and curled, the cooling treatment sample remained as fresh as the day it was picked, resulting in a leaf onion that was sweeter and more flavorful, with a good texture in the mouth.

The sugar content of the leaf onions prior to the cooling treatment was 2.0%, and while the sugar content of the leaf onions in the refrigerated group decreased to 1.2% after 2 weeks, that of the samples in the cooling treatment group increased to 3.3%. The free amino acid content was measured, which revealed that the content of sweet free amino acids (aspartic acid, threonine, cerine, and glutamic acid) increased, while the content of bitter free amino acids (valine, isoleucine, and lysine) decreased, so that the onion tasted like that of a winter crop. As above, when leaf onions were preserved in a super CFP region, a high degree of freshness was preserved and the flavor of a winter crop was imparted.

EXAMPLE 5

Preservation and Aging of Tuna

Sliced tuna was put into a refrigerator and subjected to a rapid cooling treatment down to –0.5° C. after which it was subjected to a slow cooling treatment in which it was cooled at a gradual cooling rate of 0.1° C./hour from –0.5° C. to the freezing point, after which it was preserved for 1 week in the non-freezing region (−2.5 to −3.5° C.) below the freezing point (−1.7° C.). After the food had been preserved for 1 week in this non-freezing region, its temperature was gradually elevated to the freezing point, and its temperature was then elevated to 5° C. Tables 4 and 5 show the results of examining the preservation of freshness of the tuna and the aging effect after the cooling treatment. The tuna that underwent the cooling treatment was compared with tuna from a control group that had been stored at 5° C., which revealed that the K value (an index of freshness) and the sweet free amino acid content were higher in the former.

TABLE 4

Preservation of tuna freshness

| | K value (%) | | | |
|---|---|---|---|---|
| | Start | 3 days | 5 days | 7 days |
| Control group tuna (stored at 5° C.) | 4.1 | 19.2 | 27.4 | 39.0 |
| Cooling treatment tuna | | 5.3 | 6.1 | 7.4 |

TABLE 5

Tuna aging effect (third day) from standpoint of free amino acid content

| | Content out of total free amino acids (%) | |
|---|---|---|
| | Aspartic acid | Glutamic acid |
| Before treatment | 1.3 | 7.3 |
| Control group tuna (stored at 5° C.) | 1.2 | 5.4 |
| Cooling treatment tuna | 2.2 | 11.5 |

EXAMPLE 6

Aging of Fermented Soybeans

Washed and soaked round soybeans were boiled under pressure, and soybean-fermenting bacteria were added, after which the beans were fermented at 40 to 50° C. The resulting fermented soybeans were rapidly cooled to −2.5° C., then gradually cooled to the freezing point of −3.1° C. at a rate of 0.08° C./hour, then preserved and aged for 10 days in the non-freezing region of −4.0 to −4.5° C. below the freezing point. The temperature was then gradually elevated to the freezing point, then elevated to 3° C., whereupon there was a reduction in the distinctive odor of fermented soybeans, and the product was more flavorful. Table 6 shows the results of analyzing the components of the fermented soybeans.

TABLE 6

| Component | Cooling treatment fermented soybeans | Ordinary fermented soybeans |
|---|---|---|
| Insoluble proteins | 30.2% | 11.3% |
| Free amino acids | 6.3% | 2.1% |
| Ammonia | 3.4% | 12.0% |

As is clear from the analysis results in Table 6, the cooling treatment increases the content of free amino acids and decreases the content of ammonia.

EXAMPLE 7

Cooling Treatment of Drinking Water in Super-low Temperature Region (super CFP region)

Drinking water was put into a refrigerator and subjected to a cooling treatment by rapid cooling treatment to close to the freezing point (−2.8° C.), after which it was subjected to a slow cooling treatment in which it was cooled at a gradual cooling rate of 0.2° C./hour down to the freezing point under six sets of conditions: just as it was, pressurization of 0.1 to 10 kg/cm$^2$, far infrared irradiation of 30 to 100 μm, microwave irradiation of 500 to 5000 MHz, a suitable amount of static electricity irradiation, and vibration at 1 to 20 KHz. This drinking water was preserved in a non-frozen state in the non-freezing region below the freezing point (−2.8 to −17.0° C.) to manufacture non-frozen drinking water below the freezing point. As a result, it was found that the introduction of the water into the non-freezing region was easier and more stable when the steps in which pressure, optical irradiation, and vibration were imparted were added than when said steps were not added.

EXAMPLE 8

Cooling Treatment of Beverage (beer) in Super-low Temperature Region (super CFP region)

A beverage (beer) was put into a refrigerator and subjected to a cooling treatment by rapid cooling treatment to close to the freezing point (−2.8° C.), after which it was subjected to a slow cooling treatment in which it was cooled at a gradual cooling rate of 0.01 to 0.5° C./hour down to the freezing point under six sets of conditions: just as it was, pressurization of 0.1 to 10 kg/cm$^2$, far infrared irradiation of 30 to 100 μm, microwave irradiation of 500 to 5000 MHz, a suitable amount of static electricity irradiation, and vibration at 1 to 20 KHz. This beverage (beer) was preserved in a non-frozen state in the non-freezing region below the freezing point (−2.8 to −17.0° C.) to manufacture a non-frozen beverage (beer) below the freezing point. As a result, it was found that the introduction of the beverage into the non-freezing region was easier and more stable when the steps in which pressure, optical irradiation, and vibration were imparted were added than when said steps were not added.

EXAMPLE 9

Cooling Treatment of Meat Product (sliced beef) in Super-low Temperature Region (super CFP region)

Sliced beef was wrapped in a packaging material made of Japanese paper and put into a refrigerator, where it was subjected to a cooling treatment by rapid cooling treatment to −0.5° C., after which it was subjected to a slow cooling treatment in which it was cooled at a gradual cooling rate of 0.1° C./hour down to between the freezing point and −0.5° C., after which it was preserved for 1 week in the non-freezing region (−1.7 to −18.0° C.) below the freezing point, which yielded a non-frozen meat product below the freezing point (−1.7° C.). After the food had been preserved for 1 week in this non-freezing region, its temperature was gradually elevated to the freezing point, and its temperature was then elevated to 5° C. It was found that the meat product thus obtained had reached a higher level of curing than a conventional product. The results were more or less the same when the food was covered or wrapped with polyethylene, glycerol, glycoprotein, gelatin, and the like.

EXAMPLE 10

Cooling Treatment of Fruit or the Like in Super-low Temperature Region (super CFP region)

Fruit (Asian pears) was put into a refrigerator and subjected to a rapid cooling treatment down to 0° C., after which it was subjected to a slow cooling treatment in which it was cooled at a gradual cooling rate of 0.1° C./hour down to the freezing point of −1.5° C., after which this perishable food was preserved in the non-freezing region of −2.2 to −15.0° C. below the freezing point. After the fruit had been preserved for 2 weeks in this non-freezing region and put into a supercooled state, it was subjected to a freezing treatment below −18° C., which cause the free water to move from the intracellular fluid to the extracellular fluid, resulting in the simultaneous dilution of the extracellular fluid and concentration of the intracellular fluid, which made it easier for the extracellular fluid to freeze and, conversely, made it more difficult for the intracellular fluid to freeze, thus yielding a new type of fruit product in which the intracellular fluid was preserved in a non-frozen state.

Using the above cooling treatment method, beverages (alcoholic beverages, coffee, soft drinks, and so on), thinly sliced raw fish, uncured ham, fruit, tofu, and the like were similarly subjected to a cooling treatment, which yielded the following results. With beverages, when they were frozen from a supercooled state of 1 to 10° C. below the freezing point, fine ice crystals formed immediately, resulting in a new type of smooth, sherbet-like food that melted nicely in the mouth. Meanwhile, in the case of thinly sliced raw fish, uncured ham, and fruit, for which a cool taste and the texture of ice crystals is an important condition, when these foods were frozen from a supercooled state 3 to 10° C. below the freezing point, the products were higher in quality than the products of a conventional method, with finer ice crystals, better melting in the mouth, and a milder taste. Also, this higher quality was preserved when these products were thawed. In the case of dried tofu (called Koya tofu in the Kansai region), firm tofu is put into a supercooled state close to 10° C. below the freezing point by a slow cooling treatment, and ice nuclei (ice crystals) are added, after which the tofu is frozen to freeze and modify the proteins, thus creating a spongy form, after which (in a conventional method, the tofu is flash-frozen at close to −20° C., after which it is stored under refrigeration for about 3 weeks) the tofu is thawed, drained, and dried. The dried tofu thus obtained is fine, with an extremely good texture and flavor.

INDUSTRIAL APPLICABILITY

As discussed in detail above, the present invention is a method for preserving perishable food or the like (such as vegetables, fruits, meats, and seafood) for an extended period in a non-frozen state in a non-freezing region below the freezing point, and relates to a method for preserving perishable food or the like, comprises relatively rapidly cooling the perishable food or the like (within from 1 to 30 minutes or a few hours) from room temperature to close to its freezing point, and then slowly cooling the food at a gradual cooling rate of 0.01 to 0.5° C./hour to below the freezing point. The present invention yields the following merits.

(1) Vegetables, fruits, seafood, and other such perishable foods and the like can be preserved at a high level of freshness.

(2) The decrease in freshness of a perishable food or the like that inevitably occurs immediately after its harvest can be effectively suppressed.

(3) When a perishable food or the like that has been treated by the method of the present invention for preserving a perishable food or the like is combined with an ordinary low-temperature distribution and transportation means, a perishable food or the like of high freshness and quality can be supplied to the site of the consumer without any decrease in the freshness immediately after harvest.

(4) A perishable food or the like that has been treated by the method of the present invention for preserving a perishable food or the like lasts for a long time at the consumption stage, and the rapid deterioration in quality at the consumption stage seen with conventional products can be suppressed.

(5) New types of frozen products not available in the past can be manufactured.

We claim:

1. A method for keeping a non-frozen state of a food in a temperature region below the freezing point thereof, which comprises rapidly cooling the food from room temperature to close to the freezing point, and then slowly cooling the food at a gradual cooling rate of 0.01 to 0.5° C./hour to below the freezing point to keep the food in the non-frozen state in a low temperature zone 0.1 to 10° C. below the freezing point.

2. A method for keeping a non-frozen state of a food in a temperature region below the freezing point thereof according to claim 1, wherein the method comprises elevating the temperature of the food to the freezing point or to 0.5 to 1.0° C. over the freezing point at a predetermined time and in a predetermined cycle.

3. A method for elevating the temperature of the food kept in a non-frozen state in a non-freezing region below the freezing point defined in claim 1 to room temperature, which comprises elevating the temperature of the food at a gradual temperature elevation rate of 0.01 to 0.5° C./hour to close to the freezing point, and then, elevating the temperature of the food from the freezing point to room temperature.

4. A method for manufacturing food kept in a non-frozen state below the freezing point thereof by the method defined in claim 1, wherein the food is cooled by means of a slow cooling treatment at a gradual cooling rate of 0.01 to 0.5° C./hour under predetermined pressurization conditions.

5. A method for keeping a non-frozen state of a food in a temperature region below the freezing point thereof according to claim 1, which comprises (1) irradiating the food with far infrared rays, microwaves, or static electricity, or (2) vibrating the food in a temperature zone above a breaking point thereof at a predetermined time and in a predetermined cycle to stabilize the supercooled state below the freezing point, or (1) and (2).

6. A method for keeping a non-frozen state of a food in temperature region below the freezing point thereof according to claim 1, wherein the food packaged or covered with a packaging material of a synthetic resin, paper, or a biological material; or with the packaging material coated with glycerol as ice nucleatation inhibiting substance, a glycoprotein, or gelatin as ice crystal growth inhibiting substance; or with a cover film of these substances, is cooled in a specific low temperature region 0.1 to 10° C. below the freezing point.

7. A method for keeping a non-frozen stale of only inner cells of a food of an animal or vegetable material below the freezing point thereof, which comprises preparing the food kept in a non-frozen state by the method defined in claim 1, and rapidly freezing to break a supercooled state of the food by rapid freezing treatment below the freezing point to obtain the outer cells of the food frozen, and the inner cells in a non-frozen state.

8. A method for manufacturing a frozen food from a food kept in a non-frozen state in a non-freezing region below the freezing point thereof, which comprises preparing the food kept in a non-frozen state by the method defined in claim 1, and rapidly freezing a supercooled state of the food by rapid freezing treatment below the freezing point to obtain the food frozen.

* * * * *